United States Patent
Pillay-Esnault (10) Patent No.: US 7,334,047 B1
(45) Date of Patent: Feb. 19, 2008

(54) METHOD AND SYSTEM FOR SELECTIVE LINK STATE ADVERTISEMENT BLOCKING OVER A DATA NETWORK AREA

(75) Inventor: Padmadevi Pillay-Esnault, Sanat Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 10/101,145

(22) Filed: Mar. 18, 2002

(51) Int. Cl.
*G06F 15/173* (2006.01)

(52) U.S. Cl. ....................................... 709/242; 709/239

(58) Field of Classification Search ................ 709/242, 709/244, 238, 208, 252; 370/254, 351, 225, 370/227, 401, 449
See application file for complete search history.

(56) References Cited

U.S. PATENT DOCUMENTS

| | | | | |
|---|---|---|---|---|
| 4,864,559 A * | 9/1989 | Perlman | ..................... | 370/400 |
| 5,600,794 A * | 2/1997 | Callon | ........................ | 709/241 |
| 5,825,772 A * | 10/1998 | Dobbins et al. | ............ | 370/396 |
| 5,917,820 A * | 6/1999 | Rekhter | ...................... | 370/392 |
| 6,252,856 B1 * | 6/2001 | Zhang | ........................ | 370/254 |
| 6,349,091 B1 * | 2/2002 | Li | ............................... | 370/238 |
| 6,418,476 B1 * | 7/2002 | Luciani | ...................... | 709/238 |
| 6,473,421 B1 * | 10/2002 | Tappan | ........................ | 370/351 |
| 6,483,833 B1 * | 11/2002 | Jagannath et al. | .......... | 370/392 |
| 6,496,510 B1 * | 12/2002 | Tsukakoshi et al. | ........ | 370/401 |
| 6,603,756 B1 * | 8/2003 | Tappan | ........................ | 370/351 |
| 6,606,325 B1 * | 8/2003 | Cain | .......................... | 370/408 |
| 6,614,785 B1 * | 9/2003 | Huai et al. | ................... | 370/352 |
| 6,650,626 B1 * | 11/2003 | Cain | .......................... | 370/256 |
| 6,681,232 B1 * | 1/2004 | Sistanizadeh et al. | ..... | 707/104.1 |
| 6,707,796 B1 * | 3/2004 | Li | ............................... | 370/254 |
| 6,711,152 B1 * | 3/2004 | Kalmanek et al. | .......... | 370/401 |
| 6,757,258 B1 * | 6/2004 | Pillay-Esnault | ............. | 370/254 |
| 6,775,709 B1 * | 8/2004 | Elliott | ........................ | 709/238 |
| 6,820,134 B1 * | 11/2004 | Zinin et al. | ................. | 709/238 |
| 6,823,395 B1 * | 11/2004 | Adolfsson | ................... | 709/242 |

(Continued)

FOREIGN PATENT DOCUMENTS

EP 1063814 A1 * 12/2000

(Continued)

OTHER PUBLICATIONS

Xiao, Xipeng et al., "Reducing routing table computation cost in OSPF", IEEE Internet Workshop, pp. 119-125, Feb. 1999.*

(Continued)

*Primary Examiner*—Patrice Winder
(74) *Attorney, Agent, or Firm*—Sierra Patent Group, Ltd.

(57) ABSTRACT

Method and system for efficiently handling hub and spoke area topologies in a data network under Open Shortest Path First (OSPF) routing protocol which provides selective blocking of Link State Advertisements (LSAs) includes selectively blocking the broadcast or flooding of LSAs from spoke routers to other respective spoke routers in the hub and spoke area unless route leaking is permitted for a particular spoke router, or the particular spoke router has a backdoor connection, in which case, a full shortest path first (SPF) run may be scheduled for the particular spoke router such that the amount of protocol traffic may be minimized and the SPF runs in the hub and spoke area may be reduced.

29 Claims, 6 Drawing Sheets

U.S. PATENT DOCUMENTS

| | | | |
|---|---|---|---|
| 6,845,091 B2 * | 1/2005 | Ogier et al. | 370/338 |
| 6,850,524 B1 * | 2/2005 | Troxel et al. | 370/395.32 |
| 6,885,634 B1 * | 4/2005 | Choudhury et al. | 370/217 |
| 6,985,959 B1 * | 1/2006 | Lee | 709/238 |
| 2002/0062388 A1 * | 5/2002 | Ogier et al. | 709/238 |

FOREIGN PATENT DOCUMENTS

| | | | |
|---|---|---|---|
| EP | 1185041 A2 * | 3/2002 | |

OTHER PUBLICATIONS

Aho, A.V. et al., "Hierarchical networks and the LSA N-square problem in OSPF routing", IEEE Global Telecommunications Conference, vol. 1, pp. 397-404, Dec. 2000.*

Rastogi, R. et al., "Optimal configuration of OSPF aggregates", IEEE/ACM Trans. on Networking, vol. 11, iss. 2, pp. 181-194, Apr. 2003.*

Lee, W.C., "Spanning tree method for link state aggregation in large communication networks", IEEE INFOCOM '95, v 1, p. 297-302, Apr. 1995.*

Narvaez, P. et al., "Local restoration algorithm for link-state routing protocols", IEEE Conference on Computer Communications and Networks, p. 352-357, Oct. 1999.*

Zhansong-Ma et al., "Influence of link state updating on the performance and cost of QoS routing in an intranet", IEEE Workshop on High Performance Switching and Routing, p. 375-379, May 2001.*

Bill Wagner et al., The Complete Idiot's Guide to Networking: Second Edition, Feb. 1999, QUE Corp, p. 53.*

Sriganesh Kini et al., Redundant LSA Reduction in OSPF, IETF Internet Drafts, Oct. 1999, 9 pages, retrieved from [http://mirros.isc.org/pub/www.watersprings.org/pub/id/draft-kini-dube-ospf-redundant-lsa-reduction-00.txt].*

* cited by examiner

METHOD AND SYSTEM FOR SELECTIVE LINK STATE ADVERTISEMENT BLOCKING OVER A DATA NETWORK AREA

BACKGROUND OF THE INVENTION

1. Field of the Invention

The present invention relates to method and system for efficiently handling Link State Advertisements (LSAs) over a data network. In particular, the present invention relates to method and system for providing selective LSA type blocking in a hub and spoke topology area of a data network.

2. Description of the Related Art

In a data communication networking environment, the flow of data through the network may be achieved by transmitting data from one node (or router) to the next until the destination for the data is reached. Typical routing protocols allow each router to determine the best path for forwarding data in the direction of the destination. In particular, each router performs calculations to determine the next hop router based on the known network topology. In link-state routing protocols, the existence of various nodes and connections (or links) in a network are advertised to other routers in the network. Thus, each router may be configured to learn the network topology. In turn, the knowledge of the network topology may be used by each router to determine the best "next hop" router to a particular destination. All routers in the network or in an area of the network perform similar calculations to identify the best next hop router for each destination in the network. The routers use this information to forward data to the destination specified.

An example of a link-state routing protocol is the Open Shortest Path First (OSPF) routing protocol which is an Interior Gateway Protocol (IGP) used to exchange routing information within an autonomous system generally intended for use in large networks. In particular, using link state algorithms, the OSPF routing protocol exchanges routing information between routers in the autonomous system. Routers may be configured to synchronize their topological databases, and once the routers are synchronized and the routing tables are built, the routers may be configured to flood topology information in response to some network topological change. For the OSPF routing protocol, the "best" path to a destination is the path that offers the least cost metric, and cost metrics may be configurable allowing preferred paths to be specified.

Each router operating under the OSPF routing protocol maintains an identical database describing the network topology to which it is connected. Using this topology database, each router may be configured to generate a routing table by constructing a shortest-path tree with the router at the root of the tree. The OSPF routing protocol is a dynamic routing protocol such that any changes in the network topology may be detected and the paths recalculated based on the new topology. Typically, all routers in an autonomous network run the OSPF routing protocol simultaneously, and the OSPF routing protocol allows multiple networks and routers to be grouped together. These groupings are commonly referred to as areas. Routers operating under the OSPF routing protocol may be configured to generate link state advertisements (LSAs) describing the local state of its links. Each LSA is flooded (or broadcast) throughout the area to the routers within the area such that the area's topology database includes the LSAs broadcast throughout the area.

Moreover, the specific topology of a particular area is not broadcast to other areas. Rather, a summary of the area is transmitted to other areas, thereby reducing the amount of link-state information transmitted through the network. When a router is connected to more than one area, it maintains a separate topology database for each connected area. A separate execution of the OSPF routing protocol's basic routing algorithm may be performed in each area. Additionally, routing within a particular area may be determined only by the topology of the particular area.

As link state routing protocols develop, new types of link state advertisements are created and existing link state advertisement formats are expanded or extended. New types of advertisements and extensions of existing advertisements increase the amount of data which must be exchanged between routers in a network. The increased data generates additional traffic on the network and requires additional memory or storage space within each router to store new data. Furthermore, the increased number of advertisements requires additional calculation performed by the routers to process the advertisements.

If the level of data generated and transmitted through the network in the form of advertisements becomes too large, the overall network performance may be reduced. Indeed, network routers may utilize a significant portion of their resources generating, receiving, processing and storing advertisements.

Link state protocols require that all routers in an area have the same detailed view of the topology. This mechanism works well for all topologies but it does not scale well in a very dense hub and spoke topology. Typical hub and spoke topology includes a high-end router which may be configured to serve many spoke routers (usually low end routers) on point-to-point networks. The spoke routers may also be connected to more than one hub router for redundancy purposes. Generally, the spoke routers do not communicate with each other, and all egress traffic is routed to the hub router. Indeed, changes in topology of a particular spoke router is of no interest to the other spoke routers as their immediate next hop will still be the hub router. Link state protocols by their nature propagates these changes to all spoke routers on the hub router if they belong to the same area.

Across enterprise networks, the spoke routers are often within the same area as it sometimes represent geographical distribution of their branch offices. Internet service providers (ISPs) and enterprise businesses increasingly have hub and spoke topologies at the access layer of their networks. For example, ISPs offering a pool of addresses to be used by DSL customers for instance, will have hub and spoke topologies. Another case may be for an enterprise business having a data center controlling several branch offices for credit card payment. In such hub and spoke configuration, all changes in topology on one spoke router are flooded to the hub and in turn, flooded to all the other spokes. As discussed above, the link state protocols cannot scale on very dense hubs. The changes in topology, inherent to connection and disconnection of a user may thus affect the whole area and cause constant full shortest path first (SPF) run calculations.

In view of the foregoing, it would be desirable to have a more scalable data network operating under the OSPF routing protocol in hub and spoke topologies.

SUMMARY OF THE INVENTION

In view of the foregoing, there is provided method and system for efficiently handling hub and spoke area topologies in a data network under Open Shortest Path First (OSPF) routing protocol which provides selective blocking of Link State Advertisements (LSAs).

In accordance with one embodiment of the present invention, there is provided a method of selectively blocking link state advertisements in a data network area, comprising the steps of detecting an area, receiving a link state advertisement from each of a plurality of interfaces in the area, and blocking a predetermined group of the received link state advertisements from flooding the area.

In particular, the detecting step may include the step of detecting a hub and spoke topology for the area, and further, the receiving step may include the step of detecting a plurality of spoke interfaces in the hub and spoke topology. Moreover, the blocking step may include the step of blocking the link state advertisements received from the plurality of spoke interfaces from flooding the area.

Furthermore, the plurality of interfaces may include a plurality of spoke interfaces, and the predetermined group of the received link state advertisements may include link state advertisements received from each spoke interface in the area. Additionally, the plurality of interfaces may be configured to operate under Open Shortest Path First (OSPF) routing protocol.

Moreover, the method in accordance with one embodiment of the present invention may further include the step of storing the received link state advertisements in a routing table and updating the routing table based on the received link state advertisements.

In accordance with another embodiment of the present invention, there is provided a method of selectively blocking link state advertisements in a hub and spoke area of a data network, comprising the steps of receiving a plurality of link state advertisements including a link state advertisement from each of a plurality of spoke interfaces in a hub and spoke area, defining a subset of received link state advertisements to be blocked for each of the spoke interfaces, and flooding the hub and spoke area with the received link state advertisements excluding the subset of received link state advertisements to each corresponding spoke interface.

In particular, the receiving step may include receiving a plurality of link state advertisements from each of said plurality of spoke interfaces, while the subset of blocked link state advertisements determined at the defining step may include one or more of a Type 3 link state advertisement, a Type 4 link state advertisement, a Type 5 link state advertisement and a Type 7 link state advertisement received from each of the plurality of spoke interfaces.

Additionally, the plurality of spoke interfaces may be configured to operate under Open Shortest Path First (OSPF) routing protocol, while the method in one embodiment may further include the step of storing the received link state advertisements in a link state database, and the step of updating the routing table based on said received link state advertisements.

In accordance with yet another embodiment of the present invention, there is provided a system for selectively blocking link state advertisements in a data network area, comprising a plurality of first routers, and a second router coupled to each of said plurality of first routers, said second router configured to receive a link state advertisement from each of said plurality of first routers and further, to broadcast a predetermined subset of said received link state advertisements to each of said plurality of first routers.

The system may further include a plurality of interfaces, each of the plurality of interfaces configured to couple a corresponding one of the plurality of first routers to the second router. Additionally, each of the plurality of first routers may include a spoke router, and the second router may include a hub router. Furthermore, the hub router and the plurality of spoke routers may be configured to define a hub and spoke area in the data network.

Moreover, the plurality of first routers and the second router may be configured to operate under Open Shortest Path First (OSPF) routing protocol, and the data network may be an autonomous network configured to simultaneously run the OSPF routing protocol. Further, the plurality of first routers and the second router may include a memory for storing link state advertisements respectively received by each of the plurality of first routers and the second router. In this case, the memory may include a Link State database and a Forwarding database. Additionally, each of the plurality of first routers and the second router may include a controller, the controller configured to update the corresponding memory based on the respectively received link state advertisements. Still further, the second router may be further coupled to a plurality of data networks.

These and other features and advantages of the present invention will be understood upon consideration of the following detailed description of the invention and the accompanying drawings.

DETAILED DESCRIPTION OF THE EMBODIMENTS

Figure 1:
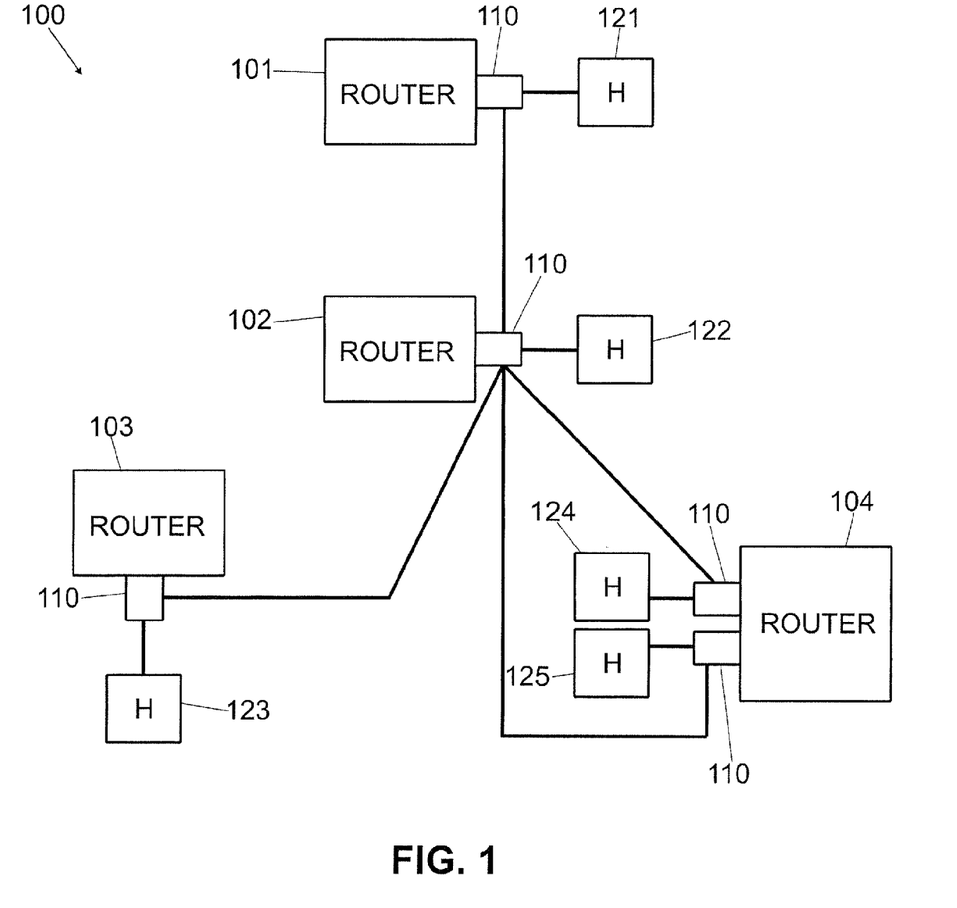
FIG. 1 illustrates a data network including multiple hosts and routers.

FIG. 1 illustrates a data network including multiple hosts and routers. Referring to FIG. 1, in the data network 100, there is provided a plurality of routers 101, 102, 103, 104, each coupled to a respective interface 110 for communicating with corresponding host devices 121, 122, 123, 124, 125 as well as for communicating with the other routers 101, 102, 103, 104 in the data network 100. As shown, interfaces 110 may include any type of interface circuits including networks capable of coupling one or more hosts to a router. Alternatively, interfaces 110 may be excluded in the data network 100 such that host devices 121, 122, 123, 124, 125 may be directly coupled to the corresponding routers 101, 102, 103, 104. Additionally, as shown in FIG. 1, router 104 may be coupled to two interfaces 110 which are respectively coupled to two host devices 124, 125. Within the scope of the present invention, data network 100 may be configured such that multiple host devices are be coupled to a single router and similarly, multiple routers may be coupled to a single host device.

Figure 2:
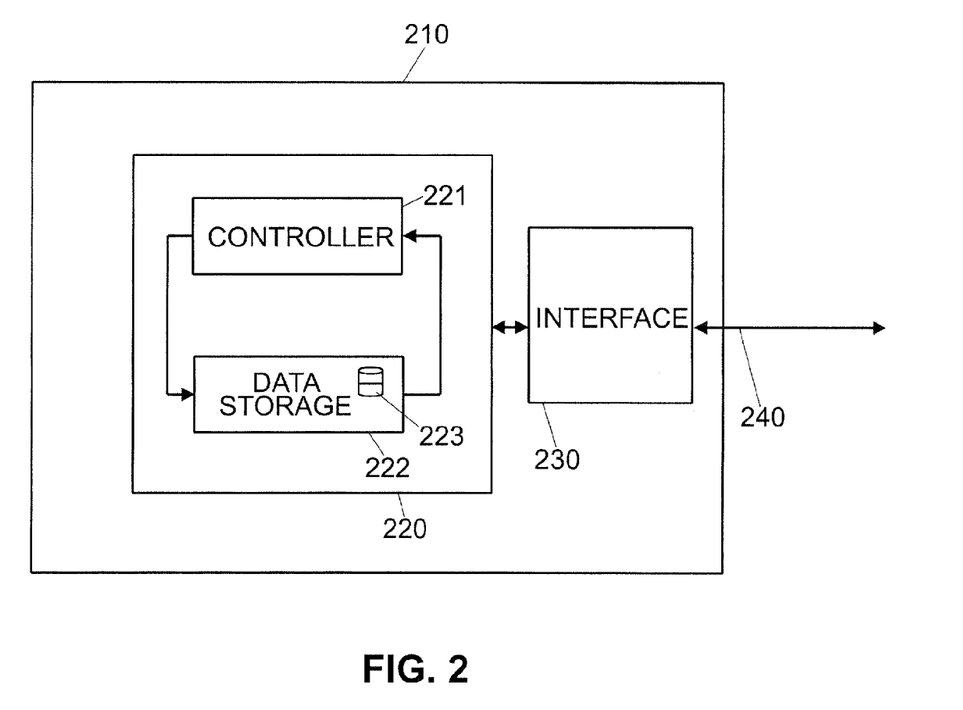
FIG. 2 illustrates a block diagram of a router shown in FIG. 1.

FIG. 2 illustrates a block diagram of a router in the data network 100 as shown in FIG. 1. Referring to FIG. 2, router 210 is provided with routing engine 220 which includes a controller 221 coupled to a data storage device 222. As shown, the controller 221 may include processors such as a central processing unit (CPU) configured to control data management and communication of router 210 including storing and retrieving data from data storage device 222 as well as transmitting and receiving data from other devices in the data network 100 (FIG. 1). Data storage device 222 may include a memory, disk drive, or any other types of data storage mechanism. Further shown in data storage device 222 of routing engine 220 is a plurality of databases 223 which may include routing table databases and other databases necessary to maintain information such that router 210 may properly forward data in the data network 100. In particular, databases 223 may include a Link State Database and a Forwarding Database such that routing engine 220 may be configured to calculate paths through a data network based on information stored in Link State Database and Forwarding Database in databases 223.

Referring back to FIG. 2, further shown in router 210 is an interface 230 coupled to the routing engine 220 for coupling the router 210 to a data network link 240 for data communication. In one aspect, interface 230 may be configured to provide a physical connection to the data network link 240. While only a single interface 230 and a single data network link 240 is shown in FIG. 2, as discussed above in conjunction with FIG. 1, router 210 may be configured to be coupled with multiple interfaces 230 for connection to multiple data networks via a plurality of data network links 240.

Figure 3:
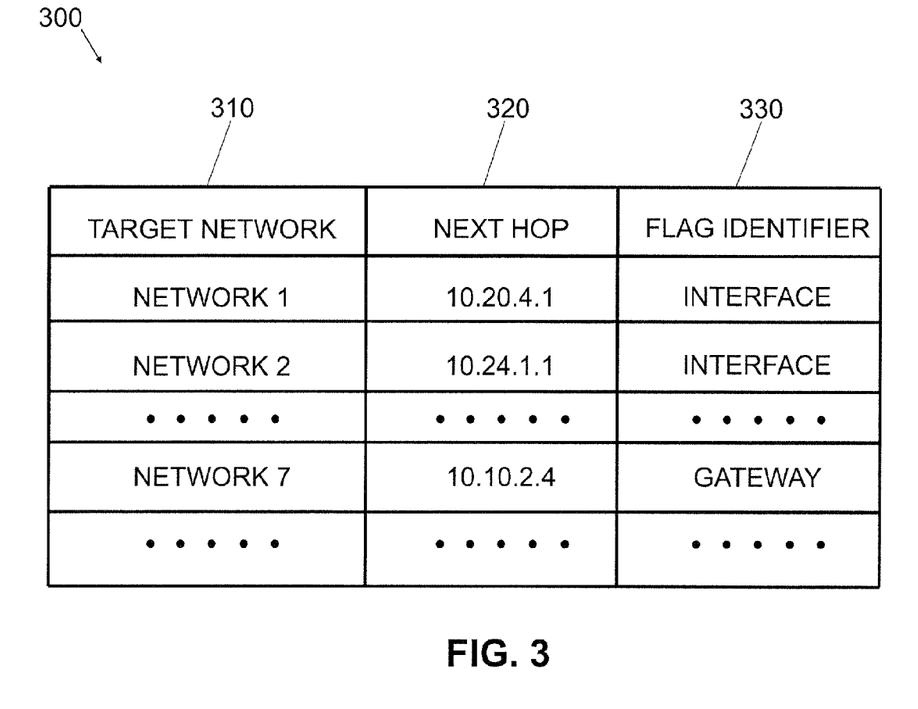
FIG. 3 illustrates one embodiment of a routing table stored in the routers shown in FIG. 1.

FIG. 3 illustrates a routing table stored in the routers shown in FIG. 1. Referring to FIG. 3, routing table 300 includes a target network field 310, a next hop field 320 and a flag identifier field 330. In particular, the routing table 300 provides the correlation between a network such as a target network to which a data packet is transferred, and a router that transfers the packet to the target network. More specifically, routing table shown in FIG. 3 may be an explicit routing table setup that illustrates the routes for transferring data packets from the routers connected to one network to the target network.

Referring back to FIG. 3, in the case where the flag identifier field 330 indicates an interface identifier corresponding to next hop field entry 320 of IP address 10.20.4.1, the corresponding target network field 310 may indicate that the target network for the next hop IP address 10.20.4.1 is for Network 1. As a further example, when the flag identifier field 330 indicates a gateway identifier, the corresponding next hop field 320 may include IP address 10.10.2.4 corresponding to Network 7 as shown by the corresponding entry in the target network field 310. As discussed above, when the flag identifier field 330 indicates an interface identifier, the next hop IP address stored in the corresponding next hop field 320 reflects the IP address of the network interface which is directly connected to the target network. On the other hand, when the entry in the flag identifier field 330 indicates a gateway identifier, the next hop IP address stored in the corresponding next hop field 320 reflects the IP address of a router which is configured to transfer the data packets to the target network. More specifically, the IP address for the next hop address field 320 corresponding to the gateway identifier in the flag identifier field 330 may be used in the case where the router in question is not connected to the target network.

Figure 4:
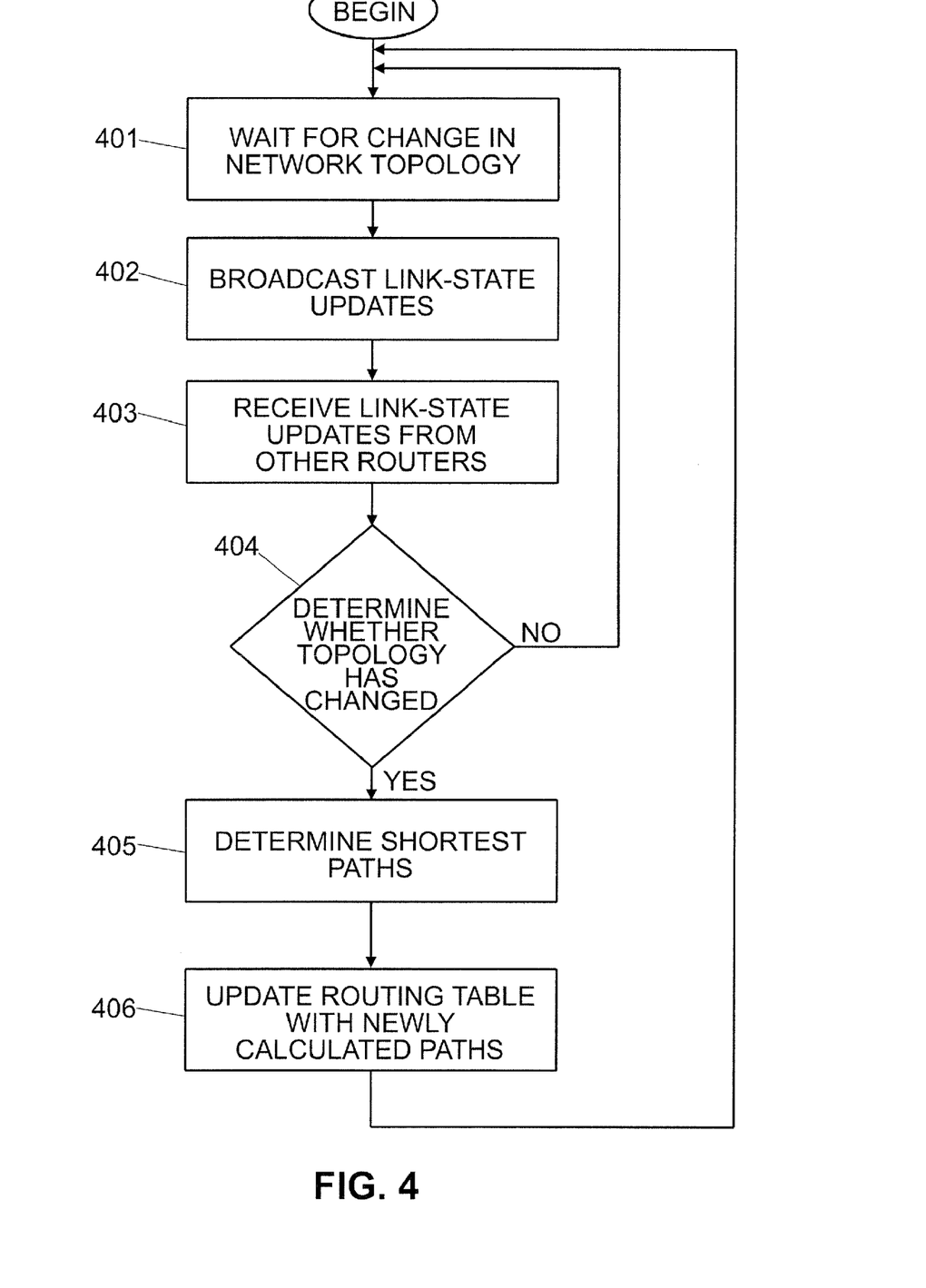
FIG. 4 illustrates a flowchart of the operation of the OSPF routing protocol algorithm in the data network shown in FIG. 1.

FIG. 4 illustrates a flowchart of the operation of the OSPF routing protocol algorithm in the data network 100 shown in FIG. 1. Referring to FIGS. 1 and 4, at step 401, routers 101, 102, 103, 104 in the data network 100 wait for a change in the topology of the data network 100. Thereafter at step 402, the routers 101, 102, 103, 104 are configured to broadcast link state updates including other data networks it can reach and the metric to these reachable data networks determined by the bandwidth. At step 403, each of the plurality of routers 101, 102, 103, 104 is configured to likewise receive the link state updates broadcast by each of the other routers in the data network 100 including the networks each router can reach and the metric of each router to these networks. Thereafter, at step 404, each of the plurality of routers 101, 102, 103, 104 are configured to determine whether the network topology has changed by comparing the link-state update information from the messages received with the link state databases stored in each respective routers 101, 102, 103, 104. If it is determined at step 404 that the network topology has not changed, then the procedure returns to step 401 and each of the plurality of routers 101, 102, 103, 104 awaits for the next change in network topology. On the other hand, if it is determined at step 404 that the topology of the data network 100 has changed, then the procedure proceeds to step 405 where each of the plurality of routers 101, 102, 103, 104 calculates the shortest path from itself to each of the networks. Thereafter at step 406, each of the plurality of routers 101, 102, 103, 104 updates its routing table based on the newly calculated paths. The procedure then returns to step 401 where each of the plurality of routers 101, 102, 103, 104 waits once again for a change in the topology of the data network 100.

In this manner, when each of the plurality of routers 101, 102, 103, 104 in the data network 100 receives an update from a neighboring router, it compares the update to its own routing table. If it learns of a better route (smaller metric) to a network from its neighbor router, the router updates its own routing table. To determine the new metric, the router adds the cost of reaching the neighbor router to the path cost reported by the neighbor. The new metric is stored in the router's routing table. In particular, a router may be configured to send updates by multicasting or broadcasting its link state update on each configured port. The OSPF routing protocol generally uses multicasting, and in the manner described above, provides a procedure for changing the routing table dynamically according to the changes in the data network.

Figure 5:
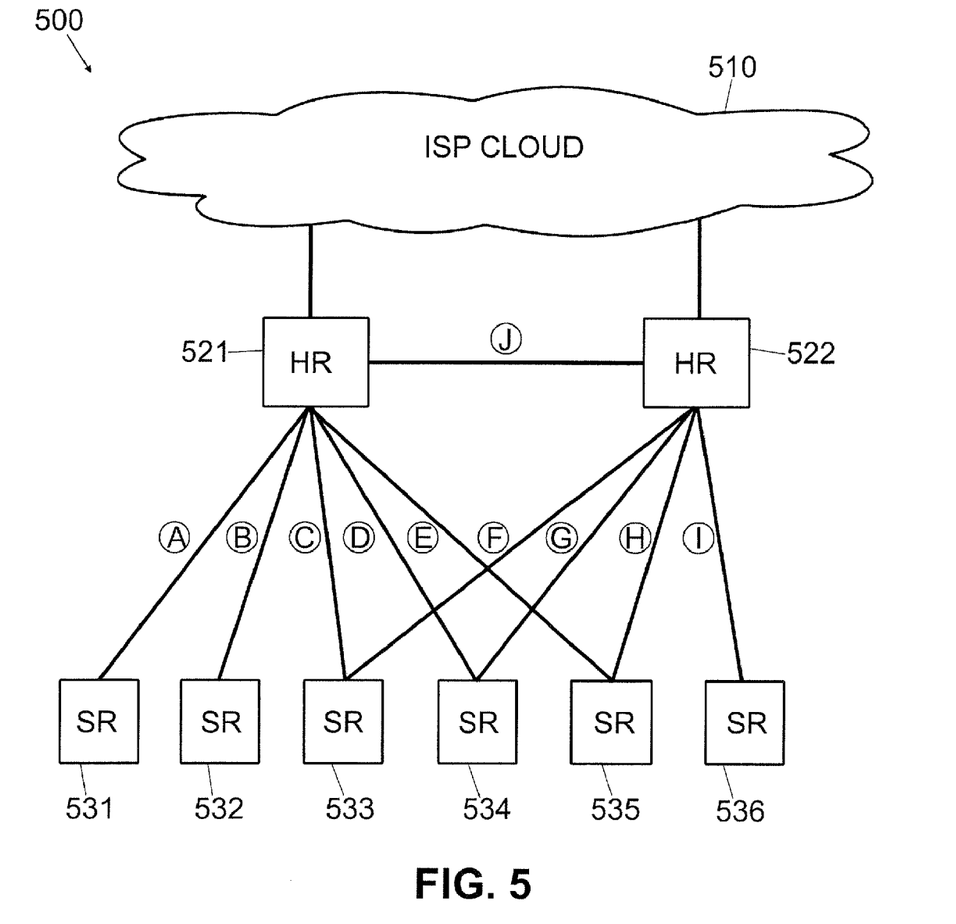
FIG. 5 illustrates a hub and spoke topology of a data network for implementing the selective LSA type blocking procedure in accordance with one embodiment of the present invention.

FIG. 5 illustrates a hub and spoke topology of a data network for implementing selective LSA type blocking procedure in accordance with one embodiment of the present invention. Referring to FIG. 5, data network 500 includes an Internet Protocol (IP) cloud 510 and hub routers 521, 522 coupled thereto. While not shown, IP cloud 510 may include additional routers and interfaces which provide connection for the hub routers 521, 522 to the respective target networks.

Also shown in FIG. 5 are spoke routers 531, 532, 533, 534, 535, 536. As shown, spoke routers 531, 532, 533, 534, 535 are coupled to hub routers 521, while spoke routers 533, 534, 535, 536 are coupled to hub route 522. In the hub-and-spoke area topology shown in FIG. 5, each of the plurality of spoke routers 531, 532, 533, 534, 535, 536 does not directly communicate with each other. Rather, each of the spoke routers 531, 532, 533, 534, 535, 536 is configured to communicate with one another through the corresponding hub routers 521, 522 via data paths A, B, C, D, E, F, G, H, and I. For example, communication between spoke router 531 and spoke router 535 may be achieved through hub router 521 via data paths A and E, while communication between spoke router 533 and spoke router 536 is achieved through hub router 522 via data paths F and I. By contrast, hub routers may be configured to directly communicate with one another such that, for example, hub router 521 communicates directly with hub router 522 via data path J.

Referring back to FIG. 5, the hub-and-spoke topology 500 may define an area (or grouping under the OSPF routing protocol) 500 including hub routers 521, 522 and spoke routers 531, 532, 533, 534, 535, 536. Since each router includes a corresponding LSA, within the area 500 shown in FIG. 5, there are eight router LSAs, each corresponding to a respective hub or spoke routers 521, 522, 531, 532, 533, 534, 535, 536. At any given time within the area 500, each of the hub and spoke routers 521, 522, 531, 532, 533, 534, 535, 536 must have the same routing information. In other words, the routing table in each of the hub and spoke routers 521, 522, 531, 532, 533, 534, 535, 536 are updated each time the area 500 is flooded with LSAs such that the routing information is correspondingly updated and the LSAs from each router in the area 500 is stored in the routing table of each of the hub and spoke routers 521, 522, 531, 532, 533, 534, 535, 536.

In the hub-and-spoke area topology of FIG. 5, since the spoke routers 531, 532, 533, 534, 535, 536 do not directly communicate with one another, the LSAs of these spoke routers 531, 532, 533, 534, 535, 536 do not provide any meaningful routing information for each of the other particular spoke routers 531, 532, 533, 534, 535, 536. In other words, spoke router 531 does not need to receive LSAs from the other spoke routers 532, 533, 534, 535, and 536 in the area 500, spoke router 532 does not need to receive LSAs from the other spoke routers 531, 533, 534, 535, 536, and so on. In other words, in the case of the spoke router 531 shown in FIG. 5, for example, hub router 521 via data path A is the only possible next hop for the spoke router 531. Moreover, for spoke routers 532 and 536, hub routers 521 and 522, respectively are the only possible next hops via data paths B and I, respectively.

However, when the area 500 is flooded, for example, when another router comes online into the data network 100 (FIG. 1) necessitating an updating procedure as shown in FIG. 4 to update the routing table of each routers in the data network 100, along with the routing information of the newly added router, spoke router 531 receives LSAs of the other remaining spoke routers 532, 533, 534, 535, 536 in the area 500, for example.

Accordingly, in the hub-and-spoke area, hub routers 521, 522 may be configured to not broadcast LSAs received from one of its spoke routers to the other spoke routers in the area. Indeed, the spoke routers need only have a limited version of the area's database. More particularly, only the router LSA and the network LSA of the hub router need to be flooded. On the other hand, if the spoke router has a backdoor connection to another spoke router, then the spoke routers may be configured to perform full exchange of their databases over that backdoor connection. The refreshing of LSAs may be achieved as described in RFC 2328 OSPF version 2. J. Moy, April 1998. Furthermore, it may be possible to give full visibility of the area to a number of spoke routers if desired by configuring the respective interfaces of the hub router and the spoke routers.

Referring back to FIG. 5, spoke routers 531, 532 and 536 may be configured such that they do not compute the next hop nor have all the topological database of the area 500. Indeed, the spoke routers 531, 532, 536 may be configured to only have a default route pointing to the respective hub routers 531, 522, respectively, as the next hop. Thus, only the hub routers 521, 522 may need to have the responsibility to compute the best path. For spoke routers 533, 534 535 which are configured to communicate with both hub routers 521, 522, for example, for redundancy purposes. In this case, data traffic may be load balanced over the two different paths. In this manner, hub routers 521, 522 may be configured to block flooding the spoke routers 531, 532, 533, 534, 535, 536 with unnecessary LSAs such that unnecessary shortest path first (SPF) runs may be avoided.

Figure 6:
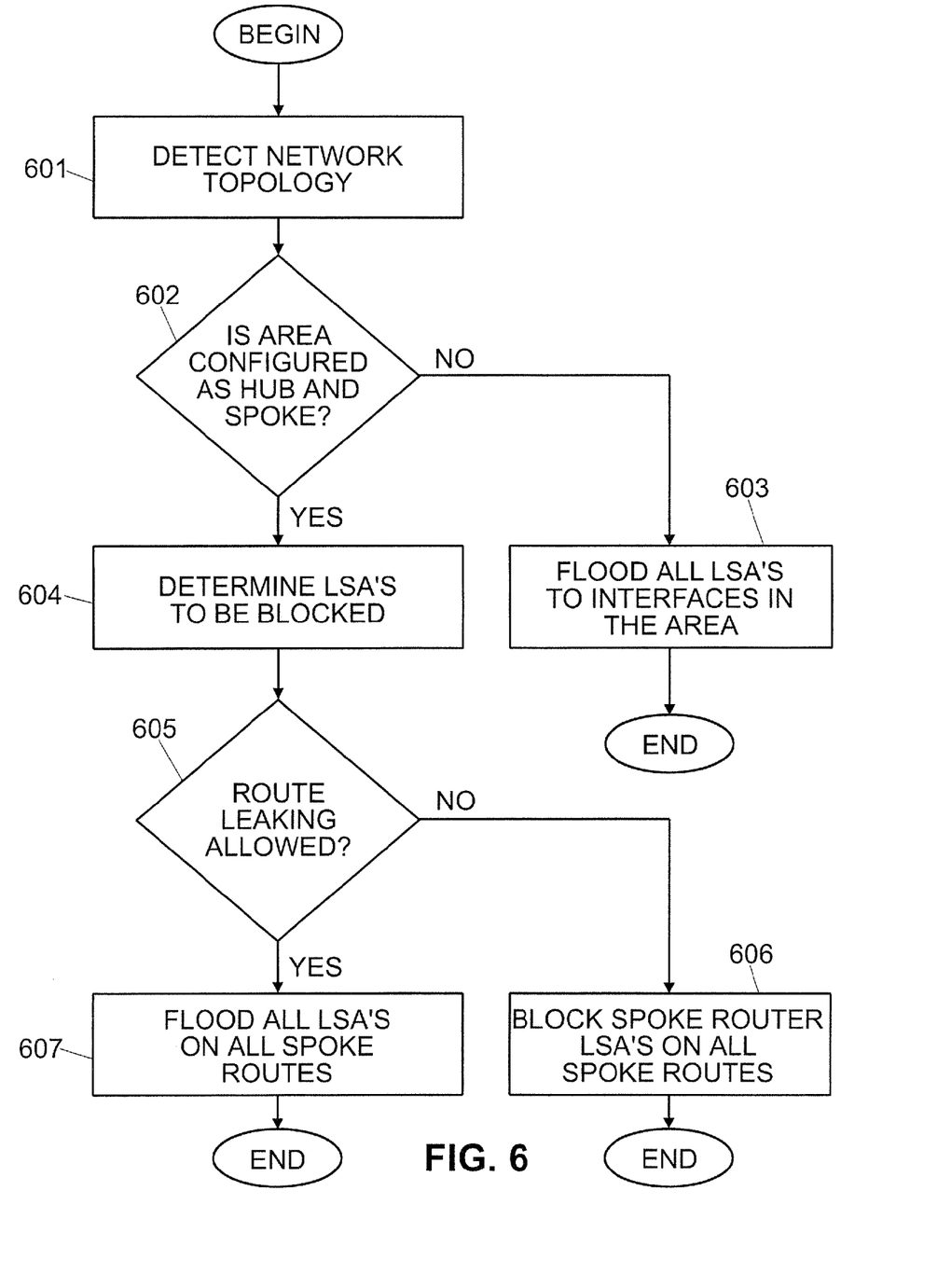
FIG. 6 illustrates a flow chart for the selective LSA type blocking procedure performed at a hub router in accordance with one embodiment of the present invention.

FIG. 6 illustrates a flow chart for the selective LSA type blocking procedure performed at a hub router in accordance with one embodiment of the present invention. Referring to FIG. 6, at step 601, the hub router detects network area topology, and at step 602, it is determined whether the area in the data network topology is configured in a hub and spoke topology. If the area detected in the data network topology is determined not to be a hub and spoke area, then at step 603, all LSAs in the area are flooded to each data path connecting the routers and interfaces in the area. In this manner, if the area detected in the data network topology is determined not to be a hub and spoke area, then all routers in the area are configured to receive the LSAs from all other routers in the area such that route changes in the area topology is broadcast to all routers for storing and updating in the respective routing tables.

On the other hand, if at step 602 it is to be determined that the area detected in the data network topology has a hub and spoke configuration, then at step 604, it is determined which LSAs are to be blocked and which LSAs are to be leaked to the respective spoke routers. In particular, at step 605 it is determined for each data path connecting the hub router to the spoke routers whether route leaking is allowed. If, for a particular spoke route, it is determined at step 605 that route leaking is allowed, then at step 607 all LSAs including LSAs from other spoke routers in the area as well as the LSA from the hub router is broadcast to the particular spoke router. On the other hand, if at step 605 it is determined that for the particular spoke route that route leaking is not allowed, then at step 606, spoke routers LSAs in the area of the data network are blocked on all other spoke routers such that within the area, spoke routers receive only the hub router LSAs and none of the other spoke router LSAs.

In this manner, in accordance with one embodiment of the present invention, in a hub and spoke area topology, the hub router may be configured to not flood an LSA received from one of its hub and spoke area interface to the other hub and spoke area interfaces. The spoke routers in the hub and spoke area need only have a limited version of the area's database. Only the router LSA and the network LSA of the hub router need be flooded. If the spoke router has a backdoor connection to another spoke router, then the spoke routers may be configured to perform full exchange of their databases over that backdoor connection. Moreover, in accordance with one aspect of the present invention, it may be possible to give full visibility of the area to a number of spoke routers. In particular, this may be configured on the respective interfaces of the hub router and the spoke routers. Accordingly, the amount of protocol traffic may be significantly reduced and the shortest path first (SPF) runs in the hub and spoke areas within the data network may be minimized.

For example, in a single hub topology, the spoke routers are connected to a single hub router and the single hub router is the only possible next hop. In this case, the spoke router is not required to compute the next hop and it does not need to have all the topological database of the area. The spoke routers need only have a default route pointing to the hub router as the next hop. Only the hub router may have the responsibility to compute the best path. While it may be possible to not configure the OSPF on the spoke routers in this topology and make use of floating statistic, this would require significant configuration, and further, extending the area to have multiple hub routers for redundancy or even allowing back door connections between the spoke routers may require a routing protocol such as OSPF.

Moreover, as discussed above, back door connections between spoke routers may be possible in which case, there may be several possible next hops. In this case, the spoke routers need to be aware of the changes of its adjacent neighbors and the spoke router may be responsible for calculating the best next hop. Additionally, for redundancy purposes, spoke routers may be connected to multiple data centers or hub routers. If both data centers are exit points, then traffic may be load balanced over the different paths. However, if the data centers have different applications, it may be possible to leak more specific routes through the appropriate data center. In this case, a primary and secondary backup center configuration may also be possible.

Furthermore, the spoke routers may be configured to act as if they each belong to a separate area. In other words, they have only a limited vision of the area comprising themselves, the hub router and eventually their backdoor connected neighbors. Moreover, a default intra-area route to the hub router may be defined on the spoke routers for connectivity. This route may be configurable on the hub routers.

In multi-home hub topologies, the default route to the different hub routers may not be the most optimum solution. Rather, leaking type 3 or type 4 LSAs to the spoke routers may be a better approach. The hub routers may be configured to have leaking prefix capabilities either through a policy or the area range command as defined in RFC 2328 OSPF version 2.

A full SPF may be scheduled to be run upon reception of a new router LSA within an area. On the other hand, in the hub and spoke area, a hub router which receives a modified router LSA from one of its spoke routers may modify its own router LSA but not run a full SPF. Only those LSAs having the spoke router as advertising router is recomputed. Furthermore, the spoke routers in the hub and spoke area are configured to not schedule a full SPF run upon reception of a new router LSA from the hub router. Indeed, the spoke routers may be configured to only run a full SPF if there is a change in the router LSA on the corresponding link that they are described. Thus, there is no change if the router LSA is from another neighboring spoke router. In this manner, the spoke routers in the hub and spoke area may no longer have a full vision of the area in which they belong such that topological changes on one spoke does not trigger flooding and eventually full SPF run on all the other spokes.

The routers in the hub and spoke area may have a general area command for all interfaces belonging to the hub and spoke area. The hub router interface that need to leak full vision of the area topology to a spoke router may be configured with have a command to leak all LSA for the area. In that case, the spoke router may have the same vision as the hub router which has the classic full area database. The area command for the hub and spoke area by default blocks all types of LSA flooding. However, it may be possible to extend this command to choose and filter the particular types of LSA that need to be leaked or blocked. As discussed above, hub and spoke area can also be a stub area, totally stubby area or not so stubby area (nssa), and thus benefit from the characteristics inherent to those areas.

In the manner described above, in accordance with the present invention, selective LSA blocking may be achieved in a hub-and-spoke topology data network. In particular, routers in a data network are configured to propagate the changes over all of its interfaces while applying split horizon. Some of the interfaces could be selectively blocked, flooding only some types of LSA, and in this manner, fast convergence may be achieved by leaking only type 1 and type 2 LSAs.

In cases where the spoke router topology changes, for example, for DSL customer connecting into the ISP and using a pool of addresses and then disconnects, or in the case where the spoke router is also an nssa, the external routes imported changes, the type 3, 4, 5, or 7 LSAs generated by the spoke router need not be flooded to the others spoke routes within the area since spoke routers within the area do not communicate with one another. Thus, in accordance with the present invention, the hub routers may be configured to block flooding of the specified type of LSA over the other interfaces it has in that particular area. Furthermore, the hub routers may be configured to block the LSA types 3, 4, 5, and 7 over a particular interface. Additionally, the hub routers may further be configured to provide a combination of the area command and the "no interface command" to permit leaking of LSA on some interfaces in the area as necessary.

Accordingly, considerable optimization in the hub-and-spoke topologies as well as fully meshed topologies can be achieved. Moreover, in accordance with the present invention, the amount of protocol traffic may be significantly reduced while further minimizing the shortest path first (SPF) runs in the specific areas. Thus, scalability in a common topology may be greatly improved, especially in the cases where customers with modem dial-ins or DSL configurations where a large number of externals are inbound to the topology and the existing architecture is quickly reaching its limits. To address such issues, prior approached included shifting those customers (connected in hub and spoke topology) on static configuration or under Routing Information Protocol (RIP), since none of the Link state protocols can effectively deal with a large number of changes in such topologies. Furthermore, the fully meshed topology may result in scalability improvement since in accordance with the present invention, it is possible to enable leaking LSA types 1 and 2, while blocking LSA type 3. Therefore, it is possible to achieve less protocol traffic storm while maintaining a very fast area convergence.

Various other modifications and alterations in the structure and method of operation of this invention will be apparent to those skilled in the art without departing from the scope and spirit of the invention. Although the invention has been described about specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of selectively blocking link state advertisements in a data network area, comprising the steps of:
    detecting an area within a network of at least one hub router in communication with a plurality of spoke routers, the area having a plurality of interfaces;
    receiving a link state advertisement from each of the plurality of interfaces in said area; and
    blocking a predetermined group of said received link state advertisements from flooding said area, wherein the predetermined group of said received link state advertisements comprises link state advertisements generated at a first spoke router in the plurality and flooded to other spoke routers in the plurality.

2. The method of claim 1 wherein said detecting step includes the step of detecting a hub and spoke topology for said area.

3. The method of claim 2 wherein said receiving step includes the step of detecting a plurality of spoke interfaces in said hub and spoke topology.

4. The method of claim 3 wherein said blocking step includes the step of blocking said link state advertisements received from said plurality of spoke interfaces from flooding said area.

5. The method of claim 1 wherein said plurality of interfaces includes a plurality of spoke interfaces, and further, wherein said predetermined group of said received link state advertisements includes link state advertisements received from said each spoke interface in said area.

6. The method of claim 1 wherein said plurality of interfaces are configured to operate under Open Shortest Path First (OSPF) routing protocol.

7. The method of claim 1 further including the step of storing said received link state advertisements in a routing table.

8. The method of claim 7 further including the step of updating said routing table based on said received link state advertisements.

9. A system for selectively blocking link state advertisements in a data network area, comprising:
a plurality of first spoke routers; and
a second hub router coupled to each of said plurality of first routers, said second router configured to detect a data network area having a hub and spoke topology comprising the plurality of first spoke routers and hub router, the area having a plurality of interfaces, receive a link state advertisement from each of said plurality of first routers over said interfaces and further, to broadcast a predetermined subset of said received link state advertisements to routers in the plurality, wherein the predetermined subset of said received link state advertisements comprises link state advertisements generated at a first spoke router in the plurality of first routers and flooded to other spoke routers in the plurality of first routers.

10. The system of claim 9 further including a plurality of interfaces, each of said plurality of interfaces configured to couple a corresponding one of said plurality of first routers to said second router.

11. The system of claim 9 wherein each of said plurality of first routers includes a spoke router, and said second router includes a hub router.

12. The system of claim 11 wherein said hub router and said plurality of spoke routers define a hub and spoke area in said data network.

13. The system of claim 9 wherein said plurality of first routers and said second router are configured to operate under Open Shortest Path First (OSPF) routing protocol.

14. The system of claim 13 wherein said data network is an autonomous network configured to simultaneously run said OSPF routing protocol.

15. The system of claim 9 wherein each of said plurality of first routers and said second router includes a memory for storing link state advertisements respectively received by each of said plurality of first routers and said second router.

16. The system of claim 15 wherein said memory includes a Link State database and a Forwarding database.

17. The system of claim 15 wherein each of said plurality of first routers and said second router includes a controller, said each controller configured to update said corresponding memory based on said respectively received link state advertisements.

18. The system of claim 9 wherein said second router is further coupled to a plurality of data networks.

19. An apparatus for providing selective link state advertisements blocking in a data network area, comprising a router configured to: detect a data network area having a hub and spoke topology and a plurality of interfaces; receive one or more link state advertisements from each of the interfaces in the plurality, the received link state advertisements generated by spoke routers within the data network area, block the flooding of link state advertisements from a first spoke router to other spoke routers in the data network area, and to broadcast remaining link state advertisements within the data network area.

20. The apparatus of claim 19 wherein the router is configured to operate under Open Shortest Path First (OSPF) routing protocol.

21. The apparatus of claim 20 wherein the data network is an autonomous network configured to simultaneously run said OSPF routing protocol.

22. The apparatus of claim 19 wherein the router further includes a memory for storing the one or more received link state advertisements.

23. The apparatus of claim 22 wherein the memory includes a Link State database and a Forwarding database.

24. The apparatus of claim 22 wherein the router further includes a controller configured to update said memory based on said respectively received link state advertisements.

25. The apparatus of claim 19 wherein the router is further coupled to a plurality of data networks.

26. The apparatus of claim 19 wherein said router includes a hub router, said system further including a plurality of spoke routers, said hub router configured to receive said one or more link state advertisements from a respective one or more of said plurality of spoke routers.

27. The apparatus of claim 26 further including a plurality of interfaces, each of said plurality of interfaces configured to couple a corresponding one of said plurality of spoke routers and to said hub router.

28. The apparatus of claim 26 wherein said hub router and said plurality of spoke routers define a hub and spoke area in said data network.

29. The apparatus of claim 26 wherein said hub router and said plurality of spoke routers are configured to operate under Open Shortest Path First (OSPF) routing protocol.

* * * * *

UNITED STATES PATENT AND TRADEMARK OFFICE
CERTIFICATE OF CORRECTION

PATENT NO. : 7,334,047 B1 Page 1 of 1
APPLICATION NO. : 10/101145
DATED : February 19, 2008
INVENTOR(S) : Padmadevi Pillay-Esnault It is certified that error appears in the above-identified patent and that said Letters Patent is hereby corrected as shown below:

Item # (63) should read --continuation of application No. 09/895,802, filed on June 29, 2001, now abandoned.--

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,334,047 B1 | Page 1 of 1 |
| APPLICATION NO. | : 10/101145 | |
| DATED | : February 19, 2008 | |
| INVENTOR(S) | : Padmadevi Pillay-Esnault | |

It is certified that error appears in the above-identified patent and that said Letters Patent is hereby corrected as shown below:

Please add the following at column 1, line 4:

-- RELATED APPLICATIONS
This application is a continuation of Application Serial No. 09/895,802, filed on June 29, 2001, now abandoned. --

Signed and Sealed this
Twenty-fourth Day of May, 2011

David J. Kappos
*Director of the United States Patent and Trademark Office*